United States Patent Office 3,579,488
Patented May 18, 1971

3,579,488
WATER-SOLUBLE COPOLYMERS OF ALKYL-ENIMINE AND ALKYLENE SULFIDE
Giffin D. Jones and Nancy B. Tefertiller, Midland, Mich., assignors to The Dow Chemical Company, Midland, Mich.
No Drawing. Filed Jan. 16, 1969, Ser. No. 791,806
Int. Cl. C08g 25/00
U.S. Cl. 260—79
6 Claims

ABSTRACT OF THE DISCLOSURE

Water-soluble copolymers of a $C_2$–$C_4$ alkylenimine and a $C_2$–$C_4$ alkylene sulfide are obtained by an acid catalyzed copolymerization using as a catalyst about 3–15 mole percent based on total monomer of a strong water-soluble organic acid, preferably an aromatic sulfonic acid. The resulting water-soluble copolymers, having an average molecular weight of about 5–50 thousand contain about 10–40 mole percent copolymerized alkylene sulfide and are effective dispersants and dewatering agents in sewage treatment and also have flocculant activity.

BACKGROUND

Polyethylenimine is a water-soluble polymer useful for a wide variety of applications including the treatment of aqueous sewage and pulp. To enhance its substantiveness to anionic particulate matter, an increase in its cationic strength is desirable. This can be achieved by altering its chemical structure.

Rosenthal et al. U.S. Pat. 3,335,116 describes novel monomeric and polymeric reaction products of alkylenimines and alkylene episulfides. The solid copolymers described by Rosenthal et al. are highly crosslinked, elastomeric products unusually resistant to dissolution in aqueous and organic solutions.

STATEMENT OF THE INVENTION

It has now been discovered that copolymerization of a $C_2$–$C_4$ alkylene sulfide with a $C_2$–$C_4$ alkylenimine can be controlled to give a water-soluble copolymer by using as a catalyst a strong water-soluble organic acid catalyst having a $pK_a$ of less than about 2.4. More specifically the process comprises copolymerizing a mixture of (1) about 10–40 percent of a $C_2$–$C_4$ alkylene sulfide and (2) about 90–60 mol percent of a $C_2$–$C_4$ alkylenimine in the presence of (3) about 3–15 mol percent of a water-soluble organic acid having a $pK_a$ of less than about 2.4 based on total monomers at about $-20°$ to $120°$ C. to yield a water-soluble cationic copolymer. Preferably the catalyst is an organic sulfonic acid. These copolymers containing about 10–40 mol percent copolymerized alkylene sulfide are effective dispersants and dewatering agents in sewage treatment and also flocculants for aqueous clay suspensions.

MONOMERS AND CATALYSTS

The acid catalyzed copolymerization is effective with $C_2$–$C_4$ alkylenimines and $C_2$–$C_4$ alkylene sulfides. Typical monomers include ethylenimine, propylenimine, isobutylenimine, ethylene sulfide, propylene sulfide, isobutylene sulfide, 1- and 2-butene sulfides.

The third essential element is a strong water-soluble organic acid catalyst having a $pK_a$ of less than about 2.4. Suitable catalysts include oxalic acid, trichloroacetic acid, toluenesulfonic acid, methanesulfonic acid, etc. Preferably the catalyst is an aromatic sulfonic acid such as toluenesulfonic acid, phenolsulfonic acid, 2-naphthalene-sulfonic acid, or benzenesulfonic acid. Conventional inorganic acid catalysts such as hydrochloric acid, sulfuric acid, ferric chloride or aluminum chloride are unsatisfactory because of poor solubility characteristics and too high activity leading to insoluble products.

COPOLYMERIZABLE CONDITIONS

To obtain a water-soluble copolymer, it is essential to use sufficient organic acid catalyst to protonate at least 5 mole percent of the initial alkylenimine. Otherwise the desired copolymerization cannot compete with the homopolymerization of the alkylene sulfide in the presence of the basic alkylenimine. Furthermore, it is necessary to use excess alkylenimine.

Thus in practice it is necessary to blend and copolymerize a mixture of about 10–40 mole percent of the $C_2$–$C_4$ alkylene sulfide and about 90–60 mole percent of the $C_2$–$C_4$ alkylenimine, in the presence of about 3–15 mole percent of the water-soluble organic acid catalyst based on the total alkylene monomers. Outside these ratios, homopolymerization and formation of water-insoluble resinous polymers become the predominate reactions.

Particularly with a solid aromatic sulfonic acid catalyst, an inert liquid diluent is desirable as a polymerization medium. Polar hydroxylic solvents are preferred, particularly $C_1$–$C_4$ alcohols including methanol, ethanol, ethylene glycol, and 1,4-butanediol. Also suitable are aqueous solutions of alcohol, acetone, dioxane, etc.

The organic acid catalyzed polymerization is extremely rapid and exothermic. Thus the reactants, diluent, and catalyst are advantageously mixed at a temperature below the effective polymerization temperature, e.g., below about $-20°$ C. Then polymerization is initiated by gradually warming the reactants. Polymerization proceeds rapidly at about $0°$ or above. Indeed if the reactants are mixed at room temperature without adequate provision for cooling, spontaneous polymerization temperatures of $140°$ C. or more have been observed with formation of insoluble disproportionation products. A polymerization temperature of about $-20°$ to $120°$ C. and preferably about $0°$–$40°$ C. is most suitable for formation of water-soluble copolymers.

COPOLYMERS

The alkylenimine-alkylene sulfide copolymers obtained by the acid catalyzed copolymerization are water-soluble solids containing about 10–40 mole percent copolymerized alkylene sulfide. As 1% aqueous solutions without salt at pH 7 the copolymers have viscosities of about 1.1–1.4 cps. indicating a polymer molecular weight of about 5,000–50,000.

These water-soluble cationic copolymers are effective dispersants and dewatering agents for treating aqueous sewage. When used to flocculate clay suspensions, they give less reduction in underflow density than a comparable molecular weight polyethylenimine.

The following examples illustrate further the present invention. Unless otherwise indicated, all parts and percentages are by weight.

EXAMPLE 1

Copolymerization of ethylenimine-ethylene sulfide with toluenesulfonic acid catalyst (A) A solution of 4.47 parts (23.5 mmoles; 10 mole percent) p-toluenesulfonic acid monohydrate (4.47 g.) in 7.89 parts ethanol was chilled in an ampule in a Dry Ice bath and 8.57 parts (199 mmoles; 83.5 mole percent) ethylenimine and 2.33 parts (39 mmoles; 16.5 mole percent) ethylene sulfide were successively added to the chilled ampule. The open ampule in a metal jacket was removed from the cold bath and vibrated as it warmed to room temperature. After 2.5 hours a viscous, yellow water-soluble polymer was recovered and dried under vacuum at room temperature for two days.

There was obtained 8.0 parts of polymer having a nitrogen content of 21.7% and containing 26 mole percent polymerized ethylene sulfide. A small amount of residual catalyst was also evident. It was soluble in water under both acidic and basic pH. A 1% solution in 0.1 N HCl without added salt had a viscosity of 1.18 cps.

(B) In another run a mixture of 8.6 parts (58 mole percent) ethylenimine and 8.6 parts (42 mole percent) ethylene sulfide were polymerized in a similar manner using 6.30 g. of p-toluenesulfonic acid monohydrate (10 mole percent based on total monomer) to yield 6.7 parts of a clear yellow, water-soluble polymer containing 35 mole percent polymerized ethylene sulfide. A 1% solution in 0.1 N HCl had a viscosity of 1.13 cps. without added salt.

*Analysis.*—Found (percent): N, 18.8; S, 19.42.

Under similar conditions using a monomer mixture containing 40 mole percent ethylene sulfide but without the p-toluenesulfonic acid catalyst, rapid polymerization occurred with formation of a solid white polymer. However it was insoluble in acid and contained only 3.69% nitrogen.

(C) A mixture of 16.5 mole percent ethylene sulfide and 83.5 mole percent ethylenimine was polymerized using 3 mole percent p-toluenesulfonic acid monohydrate dissolved in ethanol as a catalyst. After 3 hours polymerization at room temperature, a viscous milky solution was obtained from which an acid soluble copolymer containing 26 mole percent ethylene sulfide was recovered. Its viscosity as a 1% solution in 0.1 N HCl and 2% NaCl was 1.12 cps.

(D) When a 50—50 mole percent mixture of ethylenimine and ethylene sulfide was polymerized under similar conditions with 10 mole percent p-toluenesulfonic acid catalyst, a non-homogeneous polymer was obtained containing an appreciable amount of acid insoluble polymer containing 10.66% nitrogen. The acid soluble copolymer contained 14.0% nitrogen in free base form.

EXAMPLE 2

Other alkylenimine-alkylene sulfide copolymers

A solution of 1.90 parts (3 mole percent) p-toluenesulfonic acid monohydrate in 7.89 parts ethanol was cooled in a Dry Ice bath and 8.65 parts (200 mmoles; 60 mole percent) ethylenimine and 0.89 part (133 mmoles; 40 mole percent) propylene sulfide were added successively. The mixture was warmed to room temperature with agitation. A clear yellow polymer was formed. After drying in vacuo at room temperature for two days, the product contained 13.95% N and 18.57% S corresponding to a copolymer of about 37 mole percent propylene sulfide, 63 mole percent ethylenimine.

EXAMPLE 3

Flocculation test

A 1% aqueous solution of the ethylenimine-ethylene sulfide copolymer of Example 1A (COP-1A) in 0.1 N HCl was tested as a fluocculant for a 15% aqueous slurry of Minco Bond clay using a 1% solution of polyethylenimine (PEI) in 0.1 N HCl as a control standard. In this test 50 ml. portions of the clay slurry were treated with the additive at a concentration of about 135 p.p.m. based on clay solids, transferred to a graduated tube having a height of 132 mm., mixed by three inversions of the graduate, and then allowed to settle with observation of the settling rates overhead clarity, and underflow heights.

Typical results given in Table 1 show that COP–1A compares favorably with the standard PEI in settling rate and had a lower final sediment height and higher underflow density than the PEI.

TABLE 1.—FLOCCULATION OF MINCO BOND CLAY

| Time | Additive—overhead height, clarity | | |
|---|---|---|---|
| | None | 135 p.p.m., PEI | 135 p.p.m., COP–1A |
| Minutes: | | | |
| 0 | 0 | | 0. |
| 1 | 0; very cloudy | 3 mm.; clear | 3mm.; clear. |
| 3 | | 8 mm.; clear | 6 mm.; clear. |
| 5 | —; very cloudy | 18 mm.; clear | 17 mm.; clear. |
| 9 | 18 mm.; very cloudy | 36 mm.; clear | 35 mm.; clear. |
| 25 | 63 mm.; very cloudy | 57 mm.; clear | 71 mm.; clear. |
| 2.5 hours | 26 mm.; cloudy | 44 mm.; clear | 35 mm.; clear.ᵃ |

ᵃ Underflow flocculant height.

We claim:

1. A process for preparing a water-soluble copolymer of a $C_2$–$C_4$ alkylene sulfide and a $C_2$–$C_4$ alkylenimine which comprises: Copolymerizing a mixture of (1) about 10–40 mole percent of a $C_2$–$C_4$ alkylene sulfide and (2) about 90–60 mole percent of a $C_2$–$C_4$ alkylenimine in the presence of (3) about 3–15 mole percent based on total monomer of a water-soluble organic sulfonic acid having a $pK_a$ of less than about 2.41 at a temperature of about −20° to 120° C.

2. The process of claim 1 where the organic acid is an aromatic sulfonic acid.

3. The process of claim 1 where the organic acid is p-toluenesulfonic acid.

4. The process of claim 1 where the alkylene sulfide is ethylene sulfide.

5. The process of claim 1 where the alkylenimine is ethylenimine.

6. A water-soluble cationic copolymer of ethylene sulfide and ethylenimine containing about 10–40 mole percent copolymerized ethylene sulfide and about 90–60 mole percent copolymerized ethylenimine, said copolymer having a viscosity as a 1% solution in 0.1 N HCl, free of added salt, of about 1.1–1.4 cps.

References Cited

UNITED STATES PATENTS

| 2,296,225 | 9/1942 | Ulrich | 260—239 |
| 3,335,116 | 8/1967 | Rosenthal | 260—79 |
| 3,451,801 | 6/1969 | Teumac | 71—66 |

OTHER REFERENCES

Zhuk et al.: "Advances in the Chemistry of Polyethylenimine," Russian Chemical Reviews, vol. 34, No. 7, July 1965, pp. 515 to 527.

DONALD E. CZAJA, Primary Examiner

M. I. MARQUIS, Assistant Examiner

U.S. Cl. X.R.

210—54; 260—2